United States Patent
Ratza et al.

(10) Patent No.: US 6,648,419 B2
(45) Date of Patent: Nov. 18, 2003

(54) SHOCK ABSORBING SEAT

(75) Inventors: Clifton J. Ratza, Grand Rapids, MI (US); Jeffrey S. Wilcox, East Grand Rapids, MI (US); Trent A. Eekhoff, Grand Rapids, MI (US)

(73) Assignee: Attwood Corporation, Lowell, MI (US)

( * ) Notice: Subject to any disclaimer, the term of this patent is extended or adjusted under 35 U.S.C. 154(b) by 0 days.

(21) Appl. No.: 10/349,652

(22) Filed: Jan. 23, 2003

(65) Prior Publication Data

US 2003/0107257 A1 Jun. 12, 2003

Related U.S. Application Data

(63) Continuation of application No. 10/079,735, filed on Feb. 21, 2002, now abandoned, which is a continuation of application No. 09/484,973, filed on Jan. 18, 2000, now Pat. No. 6,357,830.

(51) Int. Cl.[7] .................................................. A47C 7/02
(52) U.S. Cl. .............................. 297/452.52; 297/452.46
(58) Field of Search ....................... 297/452.52, 452.46, 297/452.49, DIG. 2, 452.55, 452.42, 452.44, 378.1, 440.1

(56) References Cited

U.S. PATENT DOCUMENTS

| | | | | |
|---|---|---|---|---|
| 2,029,247 A | * | 1/1936 | Mercogliano | |
| 2,713,892 A | * | 7/1955 | Knapp | |
| 2,855,984 A | * | 10/1958 | Majorana et al. | |
| 3,055,708 A | * | 9/1962 | Baermann | |
| 3,171,691 A | * | 3/1965 | Buehrig | |
| 3,462,196 A | * | 8/1969 | Arnold et al. | |
| 3,656,807 A | * | 4/1972 | Arida et al. | |
| 3,762,770 A | * | 10/1973 | Tedesco et al. | |
| 4,123,105 A | * | 10/1978 | Frey et al. | |
| 4,147,336 A | * | 4/1979 | Yamawaki et al. | |
| 4,519,651 A | * | 5/1985 | Whitwam | |
| 4,711,497 A | * | 12/1987 | Kazaoka et al. | |
| 5,405,179 A | * | 4/1995 | Jih | |
| 5,490,718 A | * | 2/1996 | Akizuki et al. | |
| 5,601,338 A | * | 2/1997 | Wahls | |
| 5,624,161 A | * | 4/1997 | Sorimachi et al. | |
| 5,845,352 A | * | 12/1998 | Matsler et al. | |
| 5,884,977 A | * | 3/1999 | Swamy et al. | |

* cited by examiner

*Primary Examiner*—Milton Nelson, Jr.
(74) *Attorney, Agent, or Firm*—Price, Heneveld, Cooper, DeWitt & Litton

(57) ABSTRACT

A shock-absorbing outdoor seat for recreational boats and the like includes a cushion member shaped to abuttingly support a seated user on an upper surface thereof, and a one-piece, hollow molded seat body member. The seat body member includes a front portion with a connector, a raised rear portion, and a recessed base portion shaped to position the cushion member thereover. The seat also includes a shock-absorbing member positioned over the recessed base portion. The shock-absorbing member includes a deck supporting the cushion on an upper side thereof and which includes a rear attachment portion and a front attachment portion mounted to said connector of said front portion of said seat body member. The shock-absorbing member also includes a plurality of longitudinally extensible spring members having forward and rearward ends, a plurality of spring bosses molded integrally in the raised rear portion of the seat body to define apertures extending in a fore-to-aft direction which receive therethrough the rearward ends of the spring members, and a connector rod extending along a back area of the raised portion of the seat body. The connector is connected with the rearward ends of the spring members to support the deck in a pre-tensed condition over the recessed base portion of the seat body for absorbing shock loading applied to the seat by the seated user.

28 Claims, 3 Drawing Sheets

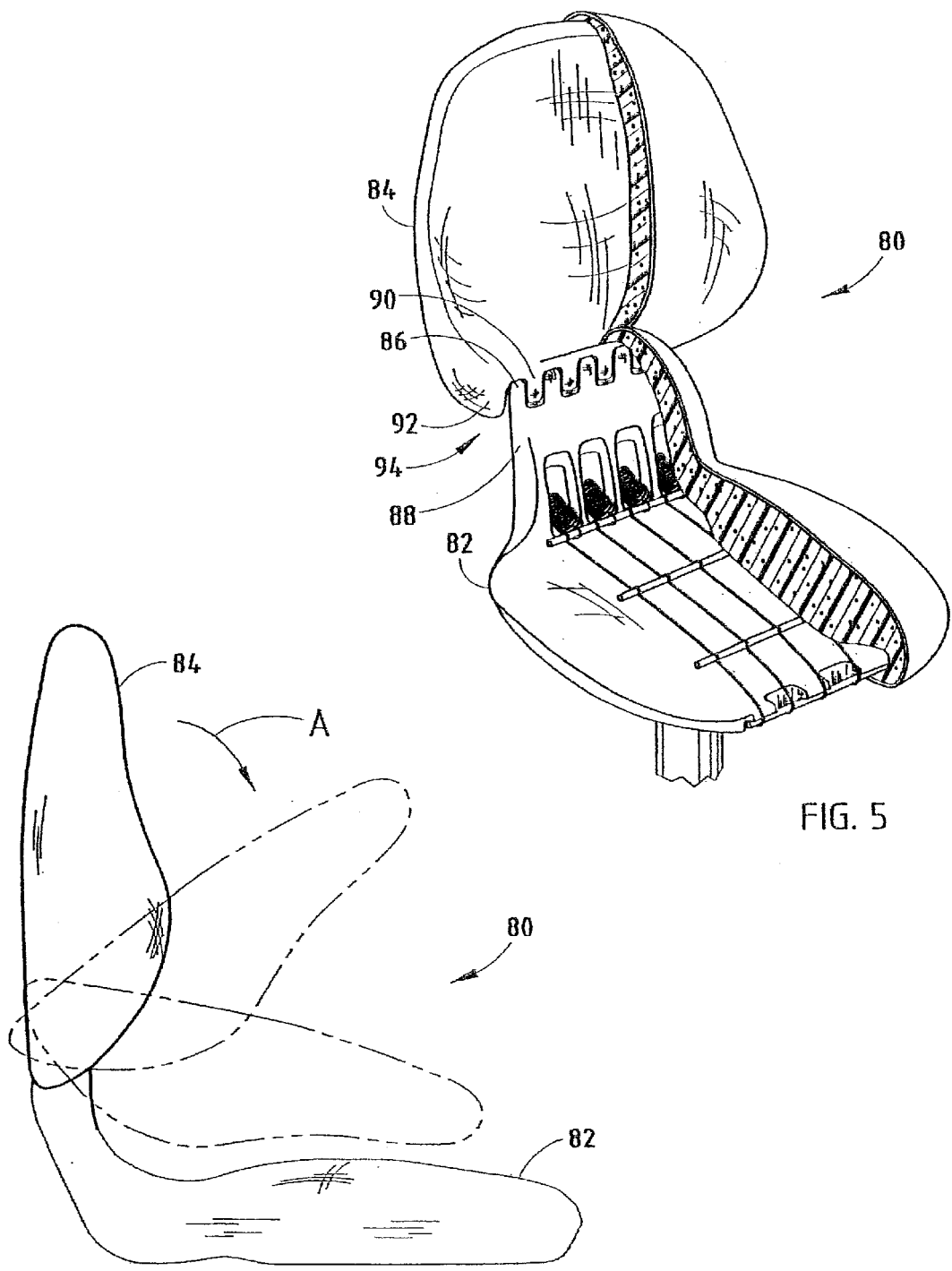

SHOCK ABSORBING SEAT

CROSS REFERENCE TO RELATED APPLICATIONS

This application is a continuation of U.S. application Ser. No. 10/079,735, filed Feb. 21, 2002 (now abandoned) and entitled SHOCK ABSORBING SEAT, which is a continuation of U.S. application Ser. No. 09/484,973, filled Jan. 18, 2000, U.S. Pat. No. 6,357,830, which are both hereby incorporated herein by reference.

BACKGROUND OF THE INVENTION

The present invention relates to outdoor seating and the like, and in particular to a hollow molded, shock absorbing seat for use in recreational boats, and other similar applications.

Recreational boating has prompted the need for many configurations and styles of boat seating. One style that has developed is pedestal-style seating in which the seat is supported on a pedestal above a boat surface such as the boat deck. During operation of the boat, the seated user absorbs the shock transmitted from the boat surface, through the pedestal and into the seat. These shock forces are intensified when the associated boat is operated in rough or turbulent waters when the hull of the boat strikes large swells and wakes.

Heretofore, boat seats have offered little in the way of suspension systems for adding comfort to the user. Typically, boat seats consist of a frame structure that is overlayed or covered with a foam padding which is then encased within a cover. The shock absorption of these seats is directly related to the amount of foam between the user and the seat frame, which has structural limitations.

A boat seating system is needed which provides sufficient shock absorption for a seated user and is economical to manufacture.

SUMMARY OF THE INVENTION

One aspect of the present invention is to provide a shock-absorbing outdoor seat for recreational boats and the like, that includes a cushion member shaped to abuttingly support a seated user on an upper surface thereof, and a one-piece hollow molded seat body member having a front portion with a connector, a raised rear portion, and a recessed base portion shaped to position the cushion member thereover. The seat also includes a shock-absorbing member positioned over a central area of the recessed base portion. The shock-absorbing member includes a deck supporting the cushion on an upper side thereof, a front attachment portion mounted to said connector of said front portion of said seat body member, and a rear attachment portion. The shock-absorbing member also includes a plurality of longitudinally extensible spring members having forward and rearward ends, a plurality of spring bosses molded integrally in the raised portion of the seat body to define apertures extending in a fore-to-aft direction which receive therethrough the rearward ends of the spring members, and a connector rod extending along a back area of the raised portion of the seat body. The connector rod is connected with the rearward ends of the spring members to support the deck in a pre-tensed condition over the recessed base portion of the seat member for absorbing shock loading applied to the seat by the seated user.

Another aspect of the present invention is to provide a shock-absorbing seat for vehicles and the like, that includes a cushion member shaped to abuttingly support a seated user on an upper surface thereof, and a seat body member having an open top, and a closed recessed base portion shaped to position the cushion member thereover. The seat further includes a shock-absorbing member positioned over the recessed base portion of the seat body member, and which includes a flexibly resilient deck supporting the cushion on an upper surface thereof, and a flexible cover enclosing the open top portion of the body member. The flexible cover is substantially air impermeable and defines with the closed base portion an interior air chamber which is substantially air tight, and which is selectively pressurized and depressurized by flexure of the cover in response to movement of the deck and the cushion. The shock-absorbing member further includes at least one port extending through the base portion and communicating with the interior air chamber with ambient air, and an air regulator covering the port and controlling the flow of air through the port to provide shock absorption for the seat.

The principle objects of the present invention are to provide a shock absorbing seat for use in recreational boats, and other similar applications, that provides improved shock absorption for a seated user, and which is economical to construct and manufacture. A further object of the present invention is to provide an air-regulated suspension seat that can be easily operated and adjusted. Yet another object of the present invention is to provide a suspension seat that is durable and capable of a long operating life, as well as being substantially water resistant.

These and other features, advantages, and objects of the present invention will be further understood and appreciated by those skilled in the art by reference to the following specification, claims, and appended drawings.

BRIEF DESCRIPTION OF THE DRAWINGS

FIG. 5 is a perspective view of a two-piece embodiment of the present invention, wherein a back member is shown in a raised use position; and FIG. 6 is a side elevational view of the seat shown in FIG. 5, wherein the back member is also shown in an intermediate position and a lowered stored position in broken lines.

DETAILED DESCRIPTION OF PREFERRED EMBODIMENT

Figure 1:
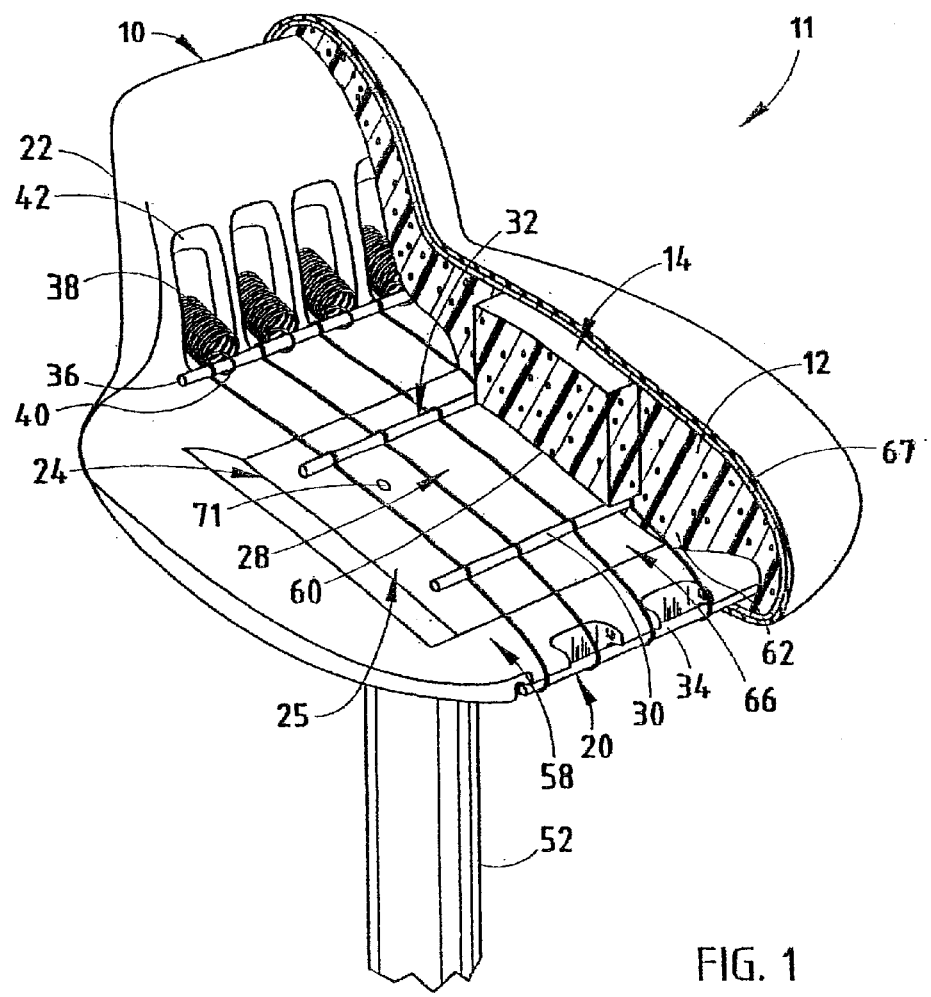
FIG. 1 is a perspective view of a shock absorbing seat embodying the present invention, with a cover, bladder and cushion partially cut away.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
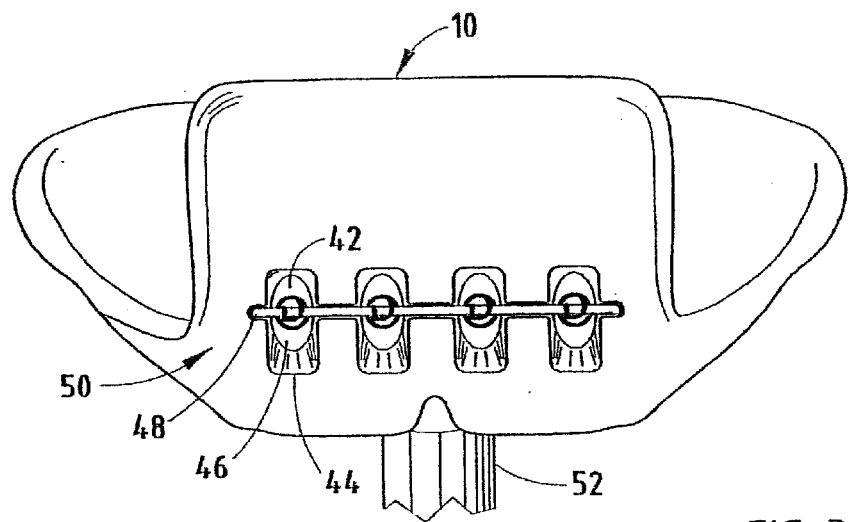
FIG. 3 is a rear elevational view of the seat.

The reference numeral 10 (FIG. 1) generally designates a two-piece shock absorbing outdoor seat embodying the present invention. Seat 10 is particularly adapted for use in recreational boats and other similar applications. Seat 10 includes a cushion member 12 shaped to abuttingly support a seated user on an upper surface 14 thereof. Seat 10 also includes a one-piece, hollow molded seat body member 16 having a front portion 18 with a connector 20, a raised rear portion 22, and a recessed base portion 24 which defines an open top portion 25 and is shaped to position cushion member 12 thereover. Seat 10 further includes a shock-absorbing member 26 positioned over a central area 28 of recessed base portion 24. Shock-absorbing member 26 includes a flexibly resilient deck 30 which supports cushion member 12 on an upper side 32 thereof. Deck 30 includes a front attachment portion 34 mounted to connector 20 of front portion 18, and a rear attachment portion 36. Shock-absorbing member 26 also includes a plurality of longitudinally extensible spring members 38 each having a forward end 40 and a rearward end 42 (FIG. 3). A plurality of oval-shaped spring bosses 44 are integrally molded within raised rear portion 22 of seat body member 16 to define apertures 46 that extend in a fore-to-aft direction and which receive therethrough rearward ends 42 of spring members 38. Shock-absorbing member 26 further includes a connector rod 48 that extends along a back area 50 of raised rear portion 22 of seat body member 16. Connector rod 48 is connected with rearward ends 42 of spring members 38 to support deck 30 in a pre-tensed condition over recessed base portion 24 of seat body member 16 for absorbing shock loading applied in a downward direction to seat 10 by a seated user.

Seat 10 is shown as part of a seat assembly 11 that includes seat 10 and a pedestal 52. In the illustrated example, seat body member 16 is constructed from a plastic or a material exhibiting similar properties. Seat body member 16 is preferably formed through a blow molding process similar to that disclosed in U.S. patent application Ser. No. 09/162,578, MOLDED TWO-PIECE SEAT SHELL, which is incorporated herein by reference. Although a blow molding process is preferred, it is foreseeable that any suitable method for hollow molding may be utilized.

An advantage of the blow-molded construction is that it provides seat body member 16 with a sufficient structural rigidity such that additional reinforcement of seat body member 16 to support shock-absorbing member 26 is unnecessary. Spring bosses 44 add structural rigidity to raised rear portion 222, while uniform wall thickness provides strength throughout the entire structure. A further advantage of the blow-molded construction of seat body member 16 is its lightweight and water resistant properties.

Figure 2:
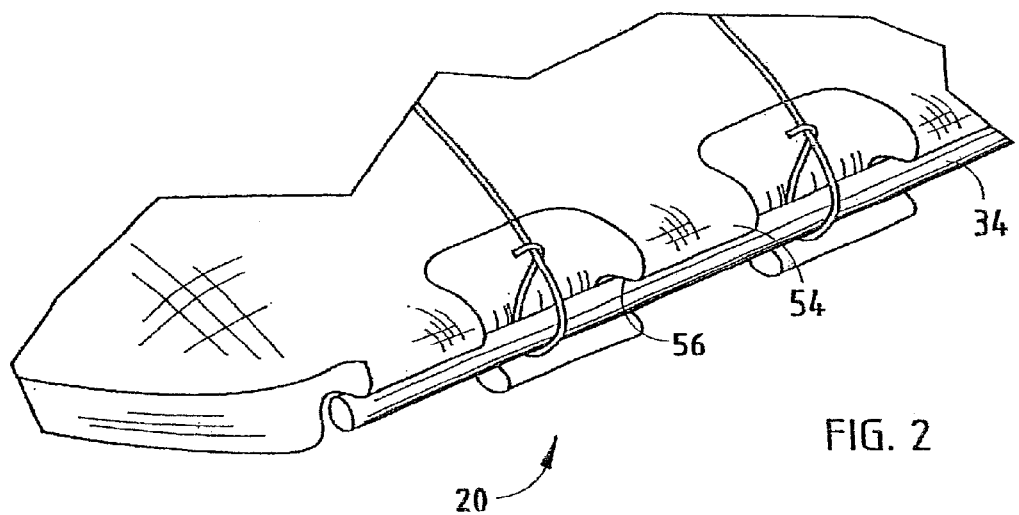
FIG. 2 is an enlarged fragmentary perspective view of a front attachment portion and a connector.

Connector 20 (FIGS. 1 and 2) of front portion 18 of seat body member 16 includes a plurality of integrally formed fingers 54 which protrude forwardly of seat body member 16 to form a ledge 56 that is adapted to rotatably receive front attachment portion 34 of deck 30 therein. Front attachment portion 34 of deck 30 is provided in the form of a cylindrically shaped, laterally extending connector rod that is received on ledge 56, thereby defining connector 20. Front attachment portion 34 of deck 30 rotates on ledge 56 when shock-absorbing member 26 flexes due to shock loading applied in a downward direction to seat 10 by the seated user.

Connector rod 48 is provided as a cylindrically shaped laterally extending connector rod that is located within raised rear portion 22 of seat body member 16 such that connector rod 48 extends through apertures 46 as defined by spring bosses 44. Rearward end 42 of each spring member 38 is pivotally connected to connector rod 48, thereby allowing each spring member 38 to pivot about connector rod 48 as shock-absorbing member 26 flexes due to a shock loading applied to seat 10 by the seated user. The oval-shape of spring bosses 44 provide clearance for spring members 38 to move in an up and down vertical direction as rearward end 42 of each spring member 38 pivots about connector rod 48.

Deck 30 of shock-absorbing member 26 is provided with a width that is less than the width of recessed base portion 24 and is disposed centrally thereover to define a pair of open wells 58 on opposite sides of deck 30. Cushion member 12 comprises a molded foam cushion having a central area 60 supported on deck 30, and opposite side pillows 62 extending into open wells 58 and supported on recessed base portion 24 to provide enhanced lateral support of the seated user when the user is not seated directly over deck 30.

A flexible cover 64 covers seat body member 16 and cushion member 12. Cover 64 is a cloth or synthetic material sufficient for resisting wear. Cover 64 encases open top portion 25 of seat body member 16, and is substantially air impermeable, thereby defining with the closed recessed base portion 24, an interior air chamber 66 which is substantially air tight, and which is selectively pressurized and depressurized by flexure of cover 64 in response to movement of deck 30 and cushion member 12. In one embodiment, the size of apertures 46 within spring bosses 44 may be varied to adjust the rate of airflow between the air within air chamber 66 and the ambient air surrounding seat 10.

A flexible bladder 67 (FIG. 1) is placed over seated body member 16 and cushion member 12 below cover 64. Bladder 67 is fixedly attached to seat body member 16 and is adapted to absorb the forces exerted on cover 64 by air escaping from within air chamber 66.

Seat body member 16 also includes at least one drain hole 71 located at a lower most point of recessed area 68, which allows water/moisture build-up with seat 10 to drain therefrom. Drain hole 71 is sufficiently small so as to not interfere with the air transfer properties of seat 10 as discussed below.

Figure 4:
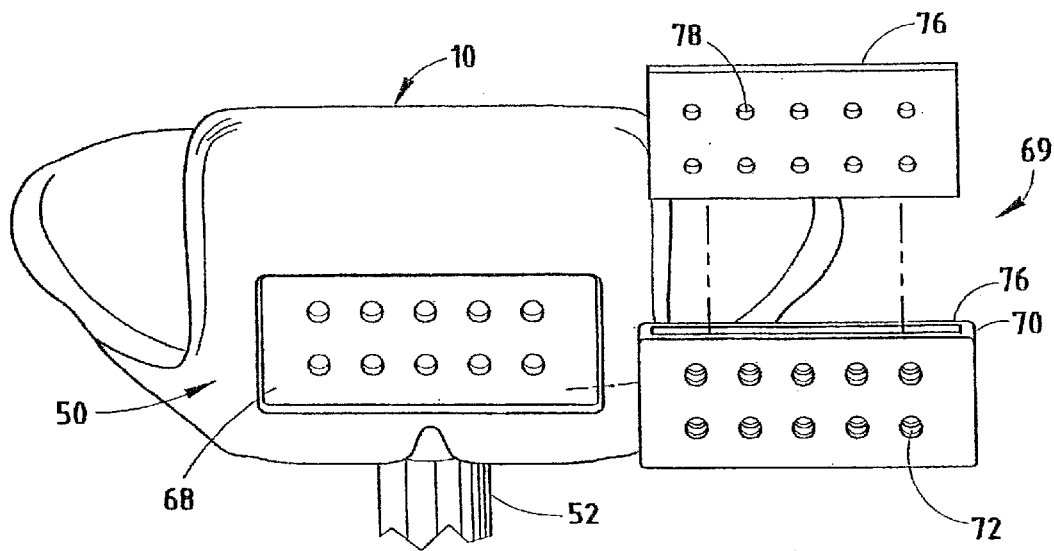
FIG. 4 is a rear elevational view of the seat with an air regulator.

In another embodiment, back area 50 (FIG. 4) of seat body member 16 is provided with a recessed area 68 adapted to receive a cover plate 70 therein, thereby forming a substantially air tight seal with back area 50. Cover plate 70 is provided with a plurality of holes or ports 72 extending therethrough, thereby allowing communication between the air within interior air chamber 66 and the ambient air surrounding seat 10. Cover plate 70 is also provided with a longitudinally extending slot 74 extending at least partially therethrough and adapted to operably slidably receive a vent plate 76 therein. Vent plate 76 is provided with a plurality of holes or ports 78 similar in size and spaced similarly to holes 72 within cover plate 70.

In operation, vent plate 76 acts in cooperation with cover plate 70 to work as an air regulator thus allowing the user to adjust the rate of pressurization and depressurization of interior air chamber 66 as cover 64 is flexed in response to movement of deck 30 and cushion member 12. More specifically, vent plate 76 may be operably slid within slot 74 of cover plate 70, thereby either partially or completely aligning and/or misaligning holes 78 of vent plate 76 of holes 72 of cover plate 70 and effectively adjusting the size of the apertures formed by holes 78 overlying holes 72. The air regulator allows the user to adjust the support offered by the air located within interior air chamber 66 for supporting loads of various weight.

In another alternative embodiment, a seat 80 (FIG. 5) is provided with a seat body member 82 similar in construction to seat body member 16 of seat 10. Seat 80 is further provided with a back body member 84 that is hingedly attached to seat body member 82. In the illustrated example, back body member 84 is constructed from a plastic or a material exhibiting similar properties. Back body member 84 is preferably formed through a blow molding process, and has a substantially uniform wall thickness. Although a blow molding process is preferred, it is foreseeable that any suitable method for hollow molding may be utilized.

As illustrated, seat body member 82 is provided with a plurality of integrally formed hinge fingers 86 that extend along a raised rear portion 88 thereof. Back body member 84 is provided with a plurality of integrally formed hinged fingers 90 extending along a lower portion 92 thereof, and which are configured so as to be mateably engagable hinge fingers 86 of seat body member 82. Hinge fingers 86 of seat body member 82 and hinge fingers 90 of back body member 84 are meshed with one another to define a normally substantially horizontally oriented hinge 94 therealong. The present embodiment utilizes five hinge fingers 82 associated with seat body member 82 and four hinge fingers 90 associated with back body member 84, however, other suitable combinations of hinge fingers could be used. As shown in FIG. 6, back body member 84 is rotatably moveable about hinge 94 between a raised use position 96, a lowered storage position 98, and a plurality of intermediate positions 100 therebetween.

While the foregoing description of the present invention is done within the context of seating for recreational boats, other applications are foreseeable, including, but not limited to, earth moving and construction equipment, lawn care equipment, electric carts, handicap carts and stadium seating.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shock-absorbing outdoor seat for recreational boats, comprising:
    a cushion member shaped to abuttingly support a seated user on an upper surface thereof;
    a seat body member, comprising:
        a front portion;
        a rear portion having a raised portion extending above the front portion; and
        a recessed base portion shaped to position the cushion member substantially thereover;
    a shock-absorbing assembly positioned over the recessed base portion, and comprising:
        a plurality of longitudinally extending support members supporting the cushion member on an upper side thereof, and comprising a rear attachment portion, and a front attachment portion operably connected to the front portion of the seat body member;
    at least one longitudinally extensible spring member comprising a forward end and a rearward end, wherein the forward end of the at least one spring member is operably connected with the rear attachment portion of the longitudinally extending support members; and
    a connector member operably connected to and extending across the rear portion of the seat body member, and being operably connected with the rearward end of the at least one spring member to support the shock-absorbing assembly in a pre-tensed condition over the recessed base portion of the seat body member for absorbing shock loading applied to the seat by the seated user.

2. The shock-absorbing outdoor seat of claim 1, wherein the at least one spring member comprises a plurality of coil springs.

3. The shock-absorbing outdoor seat of claim 1, wherein the seat body member is constructed as a single piece.

4. The shock-absorbing outdoor seat of claim 1, wherein the seat body member is blow-molded.

5. The shock-absorbing outdoor seat of claim 1, wherein the connector member extends across the raised portion of the rear portion.

6. The shock-absorbing outdoor seat of claim 1, wherein the connector member extends across a rearwardly facing surface of the raised portion.

7. The shock-absorbing outdoor seat of claim 1, wherein the longitudinal extending support members have a substantially circular cross-sectional geometry.

8. The shock-absorbing outdoor seat of claim 1, wherein the shock-absorbing assembly comprises a plurality of laterally extending support members.

9. The shock-absorbing outdoor seat of claim 1, wherein that front portion of the seat body member comprises a recessed area the receives the front attachment portion of the longitudinally extending support members.

10. The shock-absorbing outdoor seat of claim 1, wherein the longitudinally extending support members are independent of one another.

11. The shock-absorbing outdoor seat of claim 1, wherein the longitudinally extending support members are spaced apart.

12. The shock-absorbing outdoor seat of claim 1, wherein the longitudinally extending support members and the at least one spring member are independent of one another.

13. The shock-absorbing outdoor seat of claim 1, wherein the recessed base portion of the seat body member extends at least partially below the shock-absorbing assembly.

14. The shock-absorbing outdoor seat of claim 1, wherein the raised portion of the rear portion of the seat body is adapted to at least partially support a lumbar region of a seated user.

15. The shock-absorbing outdoor seat of claim 1, wherein the seat body member is constructed of plastic.

16. The shock-absorbing outdoor seat of claim 1, wherein the seat body member is hollow molded.

17. The shock-absorbing outdoor seat of claim 16, wherein the shock-absorbing assembly extends completely through the rear portion of the seat body member.

18. The shock-absorbing outdoor seat of claim 17, wherein the seat body member further comprises at least one spring boss molded integrally in the rear portion of the seat body member, and wherein the at least one spring boss defines at least one aperture extending in a fore-to-aft direction which receives therethrough the rearward end of the at least one spring member.

19. The shock-absorbing outdoor seat of claim 18, wherein the at least one spring member comprises a plurality of coil springs.

20. The shock-absorbing outdoor seat of claim 19, wherein the seat body member is constructed as a single piece.

21. The shock-absorbing outdoor seat of claim 20, wherein the seat body member is blow-molded.

22. The shock-absorbing outdoor seat of claim 21, wherein the connector member extends across the raised portion of the rear portion.

23. The shock-absorbing outdoor seat of claim 22, wherein the connector member extends across a rearwardly facing surface of the raised portion.

24. The shock-absorbing outdoor seat of claim 23, wherein the longitudinal extending support members have a substantially circular cross-sectional geometry.

25. The shock-absorbing outdoor seat of claim 24, wherein the shock-absorbing assembly comprises a plurality of laterally extending support members.

26. The shock-absorbing outdoor seat of claim 25, wherein the front portion of the seat body member comprises a recessed area that receives the front attachment portion of the longitudinally extending support members.

27. The shock-absorbing outdoor seat of claim 1, wherein the shock-absorbing assembly extends completely through the rear portion of the seat body member.

28. The shock-absorbing outdoor seat of claim 1, wherein seat body member further comprises at least one spring boss molded integrally in the rear portion of the seat body member, and wherein the at least one spring boss defines at least one aperture extending in a fore-to-aft direction which receives therethrough the rearward end of the at least one spring member.

* * * * *

UNITED STATES PATENT AND TRADEMARK OFFICE
CERTIFICATE OF CORRECTION

PATENT NO. : 6,648,419 B2
DATED : November 18, 2003
INVENTOR(S) : Ratza et al.

It is certified that error appears in the above-identified patent and that said Letters Patent is hereby corrected as shown below:

Column 1,
Line 8, "filled" should be -- filed --.

Column 6,
Line 27, "that" should be -- the --.
Line 28, "the" (first occurrence) should be -- that --.

Signed and Sealed this

Twenty-second Day of June, 2004

JON W. DUDAS
*Acting Director of the United States Patent and Trademark Office*